(12) United States Patent
Chan et al.

(10) Patent No.: US 9,201,831 B2
(45) Date of Patent: Dec. 1, 2015

(54) UNIVERSAL SERIAL BUS REPEATER (71) Applicant: Intel Corporation, Santa Clara, CA (US)

(72) Inventors: Kok Hong Chan, Folsom, CA (US); Huimin Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 13/730,672

(22) Filed: Dec. 28, 2012

(65) Prior Publication Data

US 2014/0006674 A1    Jan. 2, 2014

Related U.S. Application Data

(63) Continuation of application No. 13/539,377, filed on Jun. 30, 2012, now Pat. No. 8,982,746.

(51) Int. Cl.
*G06F 13/40* (2006.01)

(52) U.S. Cl.
CPC .................................. *G06F 13/4027* (2013.01)

(58) Field of Classification Search
CPC .............. G06F 13/385; G06F 13/4022; G06F 13/4027; G06F 2213/0042; G06F 13/387
USPC .......................................................... 710/313
See application file for complete search history.

(56) References Cited

U.S. PATENT DOCUMENTS

| | | | | |
|---|---|---|---|---|
| 4,811,195 A | * | 3/1989 | Evans | 700/4 |
| 4,862,457 A | * | 8/1989 | Morimoto | 714/775 |
| 5,642,386 A | * | 6/1997 | Rocco, Jr. | 375/355 |
| 6,744,810 B1 | * | 6/2004 | Iyer et al. | 375/214 |
| 6,871,244 B1 | | 3/2005 | Cahill et al. | |
| 7,835,386 B2 | * | 11/2010 | Binder | 370/463 |
| 8,112,571 B1 | * | 2/2012 | Letourneur | 710/311 |
| 2002/0010821 A1 | * | 1/2002 | Yu et al. | 710/100 |
| 2002/0011516 A1 | | 1/2002 | Lee | |

(Continued)

FOREIGN PATENT DOCUMENTS

JP          2003-018100 A     1/2003
WO          2014/004925 A1    1/2014

OTHER PUBLICATIONS

International Search Report and Written Opinion received for PCT Patent Application No. PCT/US2013/048363, mailed on Oct. 16, 2013, 9 pages.
Office Action received for Taiwan Patent Application No. 102119158, mailed on Oct. 16, 2014, 12 pages of English Translation and 10 pages of Office Action.

*Primary Examiner* — Farley Abad
(74) *Attorney, Agent, or Firm* — International IP Law Group, P.L.L.C.

(57) ABSTRACT

A method and system for communicating data between two devices are described herein. The method detects an electrical signal of a first protocol from a first device in a repeater, wherein the first protocol comprises single-ended signaling. The method also determines the speed of the electrical signal. Additionally, the method converts the electrical signal of the first protocol into an electrical signal of a second protocol based on the speed of the electrical signal. The second protocol comprises differential signaling. Furthermore, the method sends the electrical signal of the second protocol to a second device. In addition, the method stops the electrical signal of the second protocol to the second device when the electrical signal of the second protocol indicates an end of data flow.

38 Claims, 7 Drawing Sheets

(56) References Cited

U.S. PATENT DOCUMENTS

| | | |
|---|---|---|
| 2002/0061058 A1 | 5/2002 | Sommer |
| 2003/0093607 A1 | 5/2003 | Main et al. |
| 2006/0173980 A1 * | 8/2006 | Kobayashi et al. ........... 709/222 |
| 2006/0277339 A1 | 12/2006 | Sakaki et al. |
| 2008/0028120 A1 | 1/2008 | McLeod |
| 2008/0222438 A1 | 9/2008 | Lin et al. |
| 2012/0047294 A1 | 2/2012 | Okada |
| 2014/0006663 A1 | 1/2014 | Chen et al. |

* cited by examiner

UNIVERSAL SERIAL BUS REPEATER

CROSS-REFERENCE TO RELATED APPLICATIONS

This application is a continuation of U.S. patent application Ser. No. 13/539,377, filed on Jun. 30, 2012, entitled "A Clock-Less Half-Duplex Repeater," the contents of which are hereby incorporated by reference for all purposes.

BACKGROUND

Modern computing systems can include a variety of communication devices that send and receive data. Examples of communication devices include parallel interface devices and serial interface devices such as the universal serial bus (USB). USB is an industry protocol designed to standardize the interfaces between computer devices for communication and supplying electrical power. The USB protocol has enjoyed widespread adoption in nearly every computing device, and has received tremendous support in terms of technology development with well-established intellectual property (IP) portfolios and standardized software infrastructure.

The standard USB2 specification uses 3.3 Volt analog signaling for communications between the two USB2 ports. The 3.3 Volt signal strength tends to introduce integration challenges because some advanced semiconductor processes are moving towards a very low geometry leading to the gate oxide of a CMOS transistor no longer able to tolerate higher voltages, such as 3.3 Volt. In addition, the standard USB2 specification results in relatively high levels of power consumption at both idle and active states. As a result, USB2 may not be suitable for devices that place stringent specifications on I/O power consumption, such as mobile platforms.

BRIEF DESCRIPTION OF THE DRAWINGS

The following detailed description may be better understood by referencing the accompanying drawings, which contain specific examples of numerous objects and features of the disclosed subject matter.

DESCRIPTION OF THE EMBODIMENTS eUSB2 is a newly proposed input/output (IO) solution that aims to reduce the voltage cost and power consumption of USB 2.0 interfaces. eUSB2 uses 1.0 Volt (V) digital signaling instead of the 3.3 Volt analog signal in USB 2.0 Low-Speed (LS) and Full-Speed (FS) operations. Additionally, eUSB2 uses 0.2 V differential signaling instead of the 0.4 V differential signaling for USB 2 High-Speed (HS) interfaces. Due to the differences in the signal strength of USB2 and eUSB2, a eUSB2 repeater may be used as an electrical bridging solution to ensure that these two IO implementations may communicate with each other.

According to embodiments of the subject matter disclosed in this application, a clock-less half-duplex eUSB2 repeater is used to bridge communications between a USB2 interface and a low-voltage signaling interface such as eUSB2. A clock-less half-duplex eUSB2 repeater, also referred to herein as an eUSB2 repeater, is a device that can communicate data between a standard USB2 interface and a low-voltage signaling interface without a clock source, such as a phase locked loop (PLL), as an input. A clock-less half duplex eUSB2 repeater may not implement clock data recovery to decode and retime a data packet. The traffic flow control in a clock-less half duplex repeater can be implemented by detecting the raw electrical signaling level. A low-voltage signaling interface, as referred to herein, includes any device that can send or receive data through a universal serial bus at a low-voltage. For example, an eUSB2 interface is a low-voltage signaling interface that may send and receive data at 0.2 V for high-speed data transmission, while a standard USB2 interface may send and receive data at a higher voltage of 0.4 V for high-speed data transmission. A low voltage, as referred to herein, includes any voltage used to transmit data by an eUSB2 protocol. A high voltage, as referred to herein, includes any voltage used to transmit data by a standard USB2 protocol.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
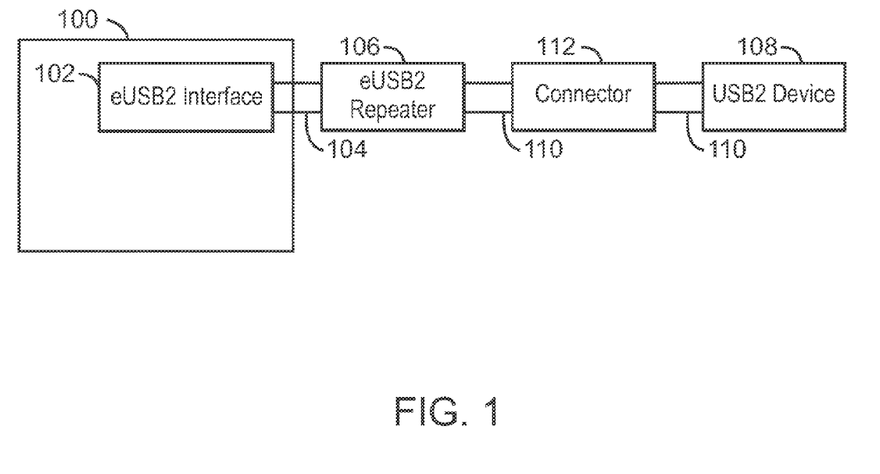
FIG. 1 is an example of a block diagram of an eUSB2 enabled host that uses an eUSB2 repeater to communicate data with a USB device.

FIG. 1 is an example of a block diagram of an eUSB2 enabled host that uses an eUSB2 repeater to communicate data with a standard USB2 device. In some embodiments, the eUSB2 enabled host 100 may be a computing system that includes an eUSB2 interface 102. The eUSB2 interface 102 can communicate data through data wires eD+/eD− 104 at a lower-voltage.

In this example, an eUSB2 repeater 106 allows for the data to be communicated between an eUSB2 interface 102 and a USB2 device 108. The eUSB2 host 100 can communicate with USB2 device 108 at low speed, full speed or high speed. The USB2 device 108 may be connected to the eUSB2 repeater 106 by a pair of USB2 data wires D+/D− 110 and a connector 112. The eUSB2 interface 102 may be connected to the eUSB2 repeater 106 by a pair of eUSB2 data wires eD+/eD− 114. The connector 112 allows for the USB2 device 108 to send and receive data from the eUSB2 repeater 106. The USB2 device 108 can communicate using any universal serial bus protocol. For example, the USB2 device may include functionality to communicate with other devices with a USB 1.0 or USB 2.0 protocol.

In some embodiments, the eUSB2 repeater 106 can detect and forward data that is received from either the USB2 device 108 or eUSB interface 102. For example, the eUSB2 repeater 106 may detect a sequence of electrical signals that represent data to transmit from the eUSB2 interface 102 to the USB2 device 108 at a high speed. In other embodiments, the eUSB2 repeater 106 can detect and execute commands. For example, the eUSB2 repeater may be configured to detect a disconnect command which instructs the eUSB2 repeater to stop sending electrical signals to a slave drive. In the example illustrated in FIG. 1, the eUSB2 repeater 106 may stop sending electrical signals to the USB2 device 108 after the eUSB2 repeater 106 receives a disconnect command.

Figure 2:
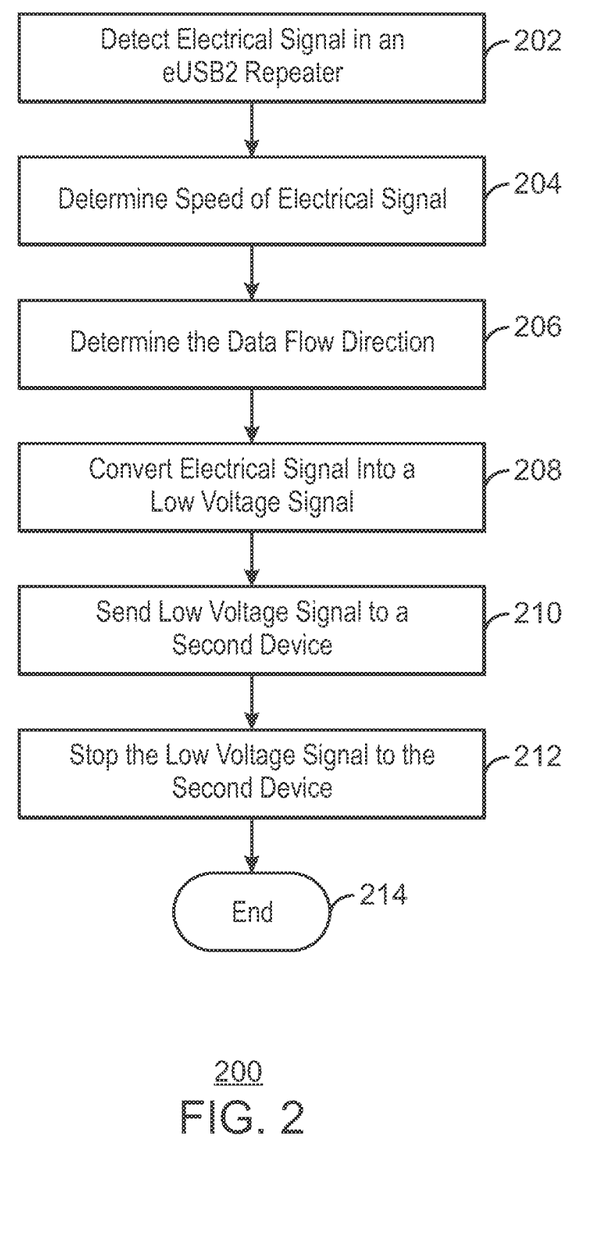
FIG. 2 is a process flow diagram of an example of a method of communicating data between two devices with a eUSB2 repeater.

FIG. 2 is a process flow diagram of an example of a method of communicating data between a eUSB2 host and a USB2 device through an eUSB2 repeater. In some embodiments, the eUSB2 repeater can be implemented as a component of a computing system. In these embodiments, the eUSB2 repeater can allow an eUSB2 interface of the computing system to communicate data with another device, such as a USB2 device, that is connected to the computing system.

At block 202, a eUSB2 repeater 106 detects an electrical signal from a first device. The electrical signal can include a sequence of analog or digital signals that can transmit data or instructions. For example, an electrical signal can include an instruction to access data that resides in a USB2 device and return the data to a computing system connected to the USB2 device. The electrical signals can be transmitted by various protocols. For example, the electrical signals can be transmitted as a single-ended signaling protocol or a differential signaling protocol. Single-ended signaling, as referred to herein, includes signals that are transmitted on one of two data lines. For example, data may be transmitted along eD− while the eD+ data line receives consecutive logical 0's. The differential signaling protocol, as referred to herein, includes transmitting data with two complementary signals along two data lines. For example, differential signaling may indicate that a sequence of logical 0's transmitted along a data line D+ may also include a sequence of logical 1's transmitted along a data line D−. Single-ended and differential signaling are described further in co-pending patent application Ser. No. 13/539,370, filed on Jun. 30, 2012, titled "A Low Power Universal Serial Bus," which is incorporated by reference herein in its entirety for all purposes.

At block 204, a eUSB2 repeater 106 determines the speed of the electrical signal. In some embodiments, the eUSB2 repeater 106 may detect electrical signals transmitted at a low speed (LS), a full speed (FS), or a high speed (HS). The LS, FS, and HS signals can have speeds indicated according to the standards for universal serial buses. Electrical signals transmitted at a low speed can take a longer period of time to transmit data between a computing system and a USB device. Additionally, electrical signals transmitted at a low or full speed can transmit data at a higher voltage than data transmitted by a high speed transmission. For example, a USB2 device may transmit a high speed electrical signal at 0.4 V, while the USB2 device may transmit a low or full speed electrical signal at up to 3.3 V.

At block 206, an eUSB2 repeater 106 determines the data flow direction. The data flow direction, as referred to herein, can indicate the flow of data between an eUSB2 host and a standard USB2 device. For example, the data flow direction may indicate an upstream direction in which data is transmitted from an eUSB2 host to a standard USB2 device. In other examples, the data flow direction may indicate a downstream direction in which data is transmitted from a standard USB device to an eUSB2 host. In some embodiments the eUSB2 repeater 106 can include a multiplexer. The eUSB2 repeater 106 can send the low voltage signal to a multiplexer and the multiplexer can select a data flow direction.

At block 208, the eUSB2 repeater 106 converts the electrical signal into a low voltage signal. As discussed above, the eUSB2 interface may transmit and receive data at a lower voltage than USB2 devices. For example, eUSB2 may use 1.0 Volt (V) digital signaling instead of the 3.3 Volt analog signal in USB 2.0 Low-Speed (LS) and Full-Speed (FS) operations. In other examples, eUSB2 may use 0.2 V differential signaling instead of the 0.4 V differential signaling for USB2 High-Speed (HS) interfaces. In this example, the eUSB2 repeater 106 may convert the electrical signal into a low voltage signal based on the speed of the transmission of data.

At block 210, the eUSB2 repeater 106 sends the low voltage signal to a second device. In some embodiments, the second device may include an eUSB2 interface. The second device can detect the low voltage signal and retrieve the data from the low voltage signal. In some embodiments, the data included in the low voltage signal can represent data or instructions to be executed on the second device.

At block 212, the eUSB2 repeater 106 stops sending the low voltage signal to the second device. In some embodiments, the eUSB2 repeater 106 may detect a sequence of electrical signals transmitted within the low voltage signal that indicates the data transmission has completed. For example, a sequence of "0110" may indicate to the eUSB2 repeater 106 that the data transmission is to be terminated between the first device and the second device. In other embodiments, the eUSB2 repeater 106 can detect and execute commands in electrical signals sent from a USB2 device or eUSB2 interface. For example, the eUSB2 repeater 106 can detect a SYNC command and detect data followed by the SYNC command to send to the second device. The process ends at block 214.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, in some embodiments the eUSB2 repeater 106 can enter an idle state while waiting for a subsequent transmission of data between the first device and the second device. Additionally, electrical signals can be sent from a USB2 device to an eUSB2 interface. For example, a high voltage signal can be sent to the eUSB2 repeater 106, which can convert the high voltage signal into a low voltage signal and send the low voltage signal to the eUSB2 interface. The conversion of a high voltage signal to a low voltage signal can include reducing the voltage of a low or full speed transmission from 3.3 V to 1.0 V or reducing the voltage of a high speed transmission from 0.4 V to 0.2 V.

Figure 3:
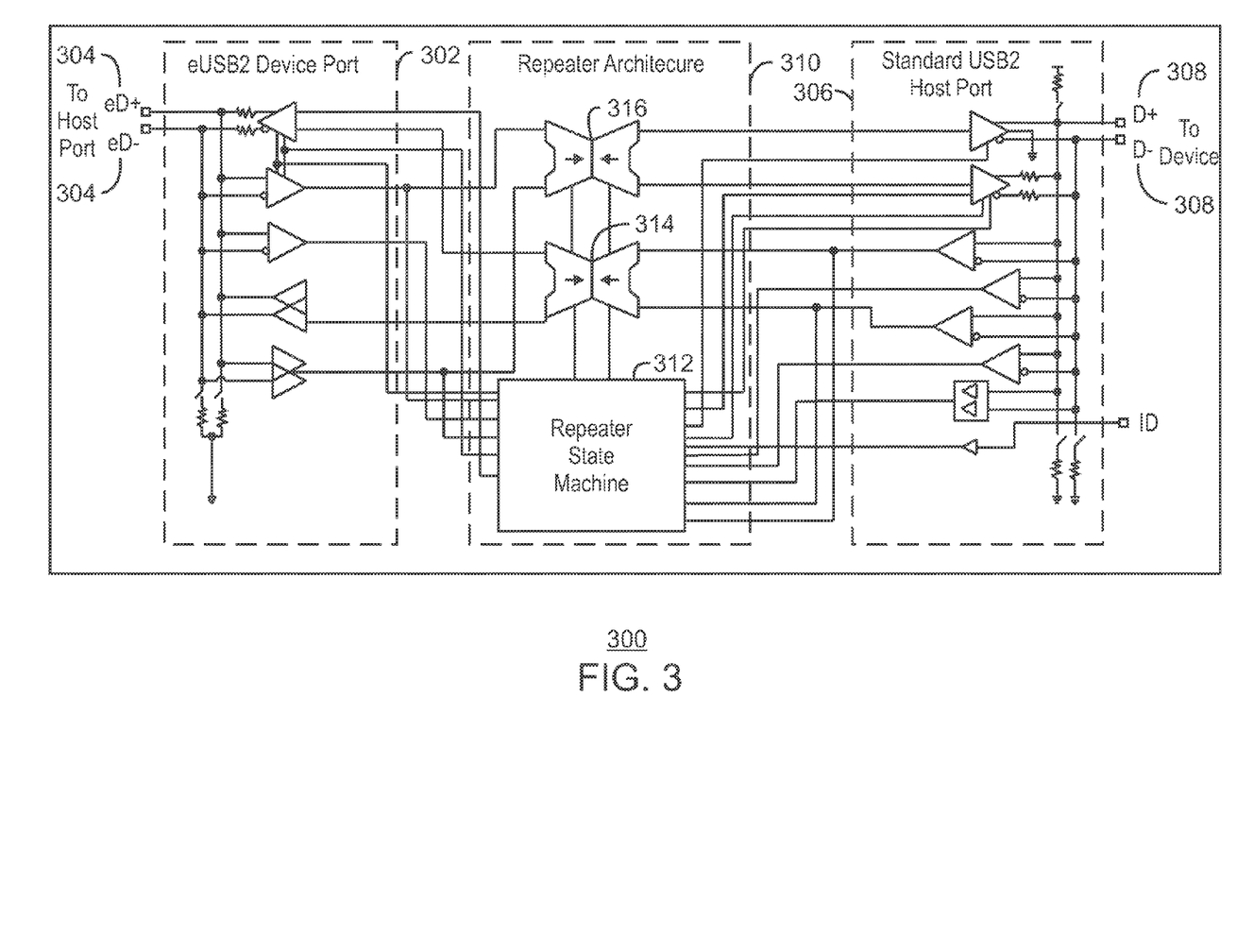
FIG. 3 is an illustration of an example of a eUSB2 repeater architecture.

FIG. 3 is an illustration of an example of an eUSB2 repeater architecture. The eUSB2 device port 302 can send and receive data in a low-voltage signal such as eD+ and eD− 304. The standard USB2 host port 306 can send and receive data in a high voltage signal such as D+ and D− 308. The eUSB2 repeater 310 can convert the low-voltage signal 304 into a high voltage signal 308 and a high voltage signal 308 to a low voltage signal 304 using a repeater state machine 312 and two voltage level-shifting multiplexers 314 and 316. The low voltage signals 304 and high voltage signals 308 can provide the eUSB2 repeater 310 with data to send the eUSB2 device port 302 or the standard USB2 host port 306. In some embodiments, the low voltage signals 304 and high voltage signals 308 can transmit commands for the eUSB2 repeater 310 to execute. For example, a command to reset the eUSB2 repeater state machine 312 can be executed without sending the command to the standard USB2 host port 306.

The eUSB2 repeater 310 can respond to control or configuration commands received from the low voltage signals 304 or high voltage signals 308 by entering any number of states. For example, an idle state can result if the eUSB2 repeater 310 commands the eUSB2 device port 302 to enable the single ended receivers, enable the control signal detector, and enable the squelch detector while disabling the receiver termination if the signal is high speed. The single ended receivers can receive data on one of two data lines. For example, data may be transmitted along D− while the D+ data line receives a logical 0. The control signal detector can indicate if a command has been received by the eUSB2 repeater 310. The squelch detector, also referred to as a squelch circuit, can detect if an electrical signal received by the eUSB2 repeater 310 is above a threshold, which indicate valid data bit for repeater to act on. In some embodiments, the eUSB2 repeater 310 may request that the standard USB2 host port 306 follow standard procedures defined by the USB2 standard. If the eUSB2 repeater 310 exits from an idle state after detecting a SYNC command, the eUSB2 repeater 310 can detect a low voltage signal 304 from the eUSB2 device port 302. The eUSB2 repeater 310 may not recover or decode the SYNC command, but the eUSB2 repeater 310 can detect the signal amplitude of the SYNC command. In High-speed mode, a squelch circuit is used to detect the signal amplitude of the SYNC command and to indicate if the SYNC command is valid. In Low-speed and Full-speed modes, a single-ended receiver is used to detect the signal amplitude of the SYNC command and to indicate if the SYNC command is valid. The SYNC command indicates the repeater is to forward data in an electrical signal to a second device. If the eUSB2 repeater 310 exits from an idle state after receiving a SYNC command, the eUSB2 repeater 310 can receive a converted high voltage signal 306. The eUSB2 repeater 310 can also enter a "low speed keep alive" state if a keep alive control signal is received and forward the keep alive control signal to the destination device following the defined signaling format. The eUSB2 repeater 310 can enter an idle state if a control signal of Suspend is received at eD+/eD− 304. Control message signaling is described further in co-pending patent application Ser. No. 13/539,375, filed on Jun. 30, 2012, titled "Explicit Control Message Signaling," which is incorporated by reference herein in its entirety for all purposes. The eUSB2 repeater 310 can enter reset if a reset control signal is received. The eUSB2 repeater 310 can enter a connect state if device disconnect is detected.

The eUSB2 310 can also enter a receive state in which USB packets are received from D+/D− 308. If the eUSB2 repeater 310 is receiving USB2 packets, the eUSB2 repeater 310 can operate at REP mode and the eUSB2 repeater 310 can forward the USB2 packets upon detection of an un-squelch condition at D+/D− 308. REP mode and NREP mode are discussed in greater detail below in relation to FIG. 7.

In some embodiments, the eUSB2 repeater 310 can enter an idle state upon detection of squelch condition at D+/D− 308. A squelch condition may occur when a squelch circuit included in the repeater state machine 312 indicates an absence of electrical signal has been detected. The squelch condition may include a threshold value. If an electrical signal is detected above the threshold value, the squelch circuit can indicate an electrical signal has been detected. If an electrical signal is detected below the threshold value, the squelch circuit can indicate the electrical signal is an erroneous signal. For example, the squelch circuit may detect a faint electrical signal below a threshold that is a result of the physical operating environment such as static electricity.

In some embodiments, if the eUSB2 repeater 310 detects a USB2 packet, the eUSB2 repeater 310 forwards the USB2 packet to D+/D− 308. The eUSB2 repeater 310 can forward the USB packet in REP mode. While forwarding data to D+/D− 308, the eUSB2 repeater 310 can maintain a device ping counter to track the transmission of a device ping. A device ping, as referred to herein, includes a logical 1 signal from eD− in a Full speed or Low speed transmission or 8 unit intervals (UI) of static bit in High-speed transmission. The repeater eUSB2 port, upon device ping counter timeout, can periodically send a device a ping signal to indicate the presence of a device. In some embodiments, when the eUSB2 repeater 310 stops receiving low voltage signals 304 from the eUSB2 port 302, the eUSB2 repeater 310 can enter the idle state. For example, the eUSB2 repeater 310 can enter the idle state if the eUSB2 repeater 310 has completed the transmission of USB packet at D+/D− 308.

Figure 4:
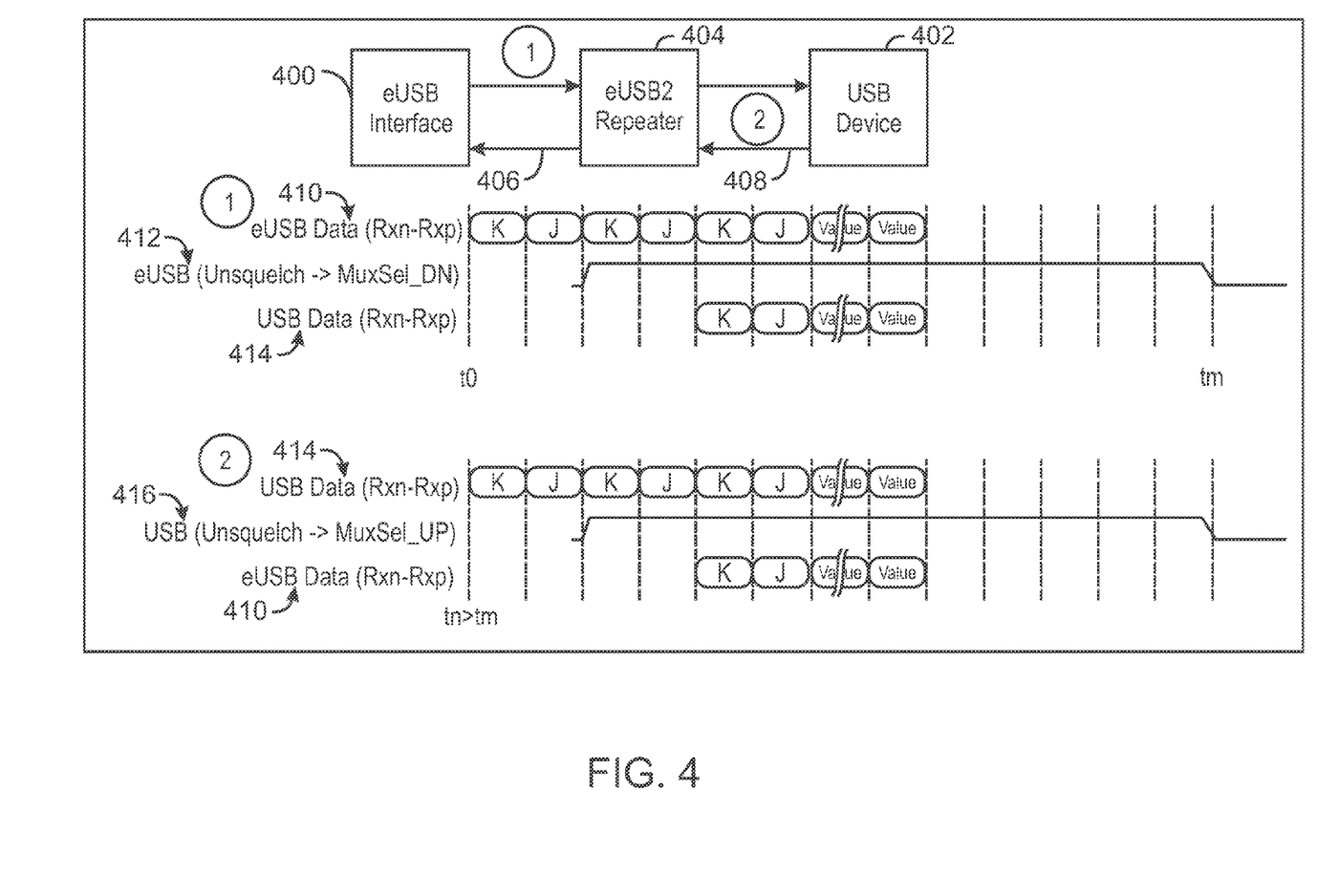
FIG. 4 is a timing diagram illustrating a High-Speed embodiment of data communication between an eUSB2 interface and a USB device through a eUSB2 repeater.

FIG. 4 is a timing diagram illustrating a High-Speed embodiment of data communication between an eUSB2 interface 400 and a USB2 device 402 through an eUSB2 repeater 404. As discussed above in regard to FIG. 1, the eUSB2 repeater 404 can send and receive data on data lines such as eD+, eD−, D+, and D−. In some embodiments, the data lines eD+ and eD− 406 transmit data at a lower voltage, while data lines D+ and D− 408 can transmit data at a higher voltage. The data lines 406 and 408 can also transmit commands between the eUSB2 interface 400 and the USB2 device 402. In some embodiments, the commands are represented by a series of logical 1's and logical 0's. A logical '1' can describe a state of a data line in which a voltage at the data line is above a threshold. For example, a threshold may indicate any voltages above a certain value are to be considered a logical '1.' A logical '0' can describe a state of a data line in which a voltage at the data line is below a threshold. Block J refers to a differential-1 data state, where eD+ is a logical '1' and eD− is a logical '0'. Block K refers to a differential-0 data state, where eD+ is a logic '0' and eD− is a logical '1'.

The example of a communication between the eUSB2 interface 400 and the USB2 device 402 illustrated in FIG. 4 includes the eUSB2 interface 400 sending (as indicated by the circled 1) an electrical signal to the USB2 device 402 along the data lines eD+ and eD− 406. The eUSB2 data 410 represents the data transmitted by the data lines 406. As data is transmitted to the eUSB2 repeater 404 from the eUSB2 interface 400, the eUSB2 data indicates a block K followed by a block J. The eUSB2 data 410 also includes a repeat of the block K followed by the block J. The second repetition of the blocks K and J in eUSB2 data 410 indicates to the eUSB2 repeater 404 that the eUSB2 interface 400 is transmitting data to the USB2 device 402. The eUSB2 repeater 404 may select a downstream data direction with a multiplexer to allow the data to be transmitted from the eUSB2 interface 400 to the USB2 device 402. In some embodiments, the multiplexer may wait a predetermined period of time before selecting the data direction. For example, the multiplexer may wait to receive two logical data signals before selecting the data direction. The eUSB2 repeater 404 can convert the eUSB2 data 410 to USB2 data 414 by amplifying the voltage of the eUSB2 data 410 to form USB2 data 414. For example, the eUSB2 data 410 may be amplified from 0.2 V to 0.4 V for a high speed transmission of data. The USB2 device 402 can retrieve the USB2 data at 414.

In some embodiments, the USB2 device 402 and the eUSB2 interface 400 can transmit data when the USB2 device sends (as indicated by the circled 2) an electrical signal to the eUSB2 device 400 through the data lines D+ and D− 408. The USB2 data at 414 represents the data transmitted through the data lines D+ and D− 408. As data is transmitted to the eUSB2 repeater 404 from the USB2 device 402, the USB2 data 414 indicates a block K followed by a block J. The USB2 data 414 can also include a repeat of the block K followed by the block J. The second repetition of blocks K and J in the USB2 data 414 indicates to the eUSB2 repeater 404 that the USB2 device 402 is transmitting data to the eUSB2 interface 400. The eUSB2 repeater 404 may select an upstream data direction with a multiplexer at 416 (also illustrated in FIG. 3 at blocks 314 and 316) to allow the data to be transmitted from the USB2 device 402 to the eUSB2 interface 400. A single-ended receiver is used to generate the signal for the multiplexer when the speed of the data transmission is low speed or full speed. A squelch circuit is used to generate the signal for the multiplexer when the speed of the data transmission is high speed. The eUSB2 repeater 404 can convert the USB2 data 414 to eUSB2 data 410 by reducing the voltage of the USB2 data 414 to form eUSB2 data 410. For example, the USB2 data 414 may be reduced from 0.4 V to 0.2 V for a high speed transmission of data. The eUSB2 interface 400 can then retrieve the eUSB2 data 410.

It is to be understood that FIG. 4 is included for illustrative purposes and additional devices may be used to communicate data between the eUSB2 interface 400 and the USB2 device 402. For example, a connector may forward the data between the eUSB2 repeater 404 and the USB2 device 402. Furthermore, the eUSB2 repeater architecture can be used to communicate data between two devices that do not include an eUSB2 interface. In some embodiments, the eUSB2 repeater architecture may communicate data between any two devices that support a parallel or serial interface. For example, the eUSB2 half-duplex repeater architecture may be used to communicate data between a USB 1.0 device and a USB 2.0 device.

Figure 5:
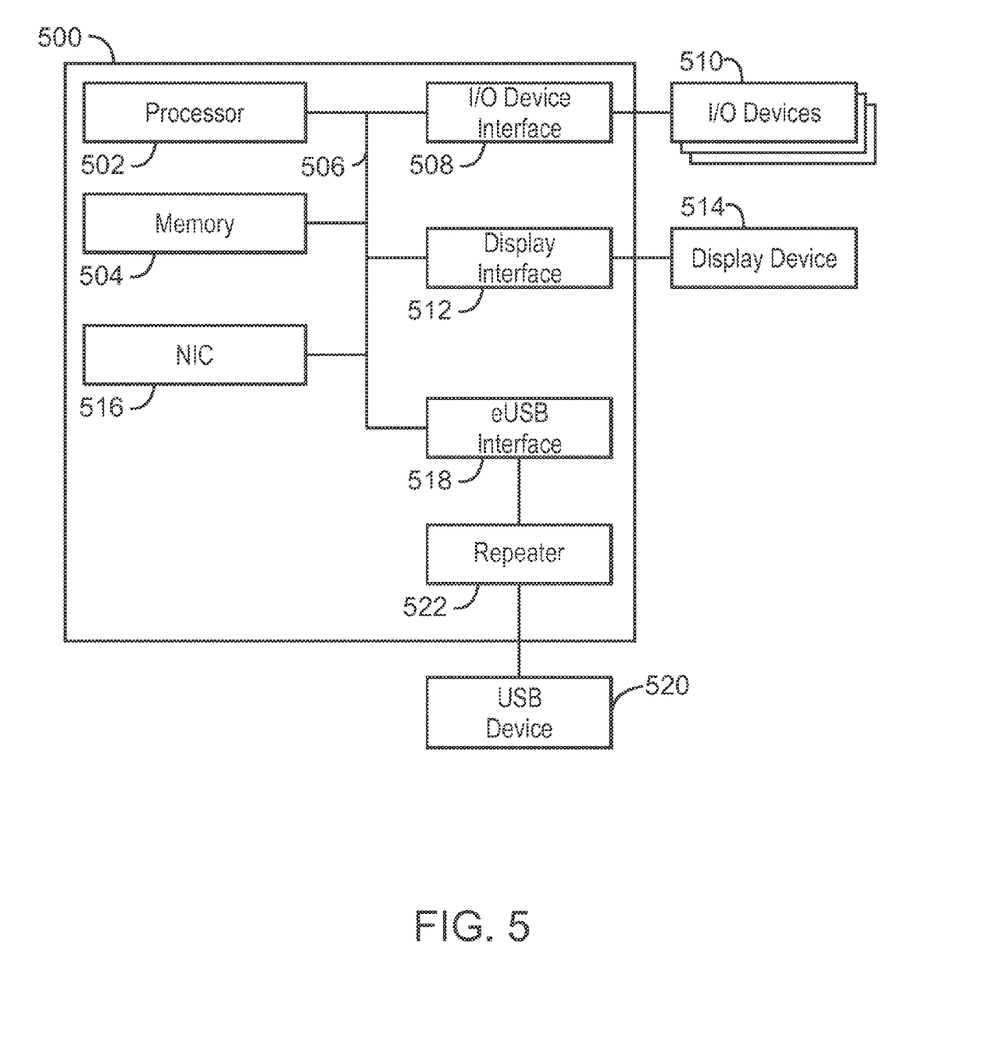
FIG. 5 is a block diagram of an example of a computing system that communicates data between an eUSB2 interface and a USB device.

FIG. 5 is a block diagram of an example of a computing system that communicates data between an eUSB2 interface and a USB2 device. The computing system 500 may be, for example, a mobile phone, laptop computer, desktop computer, or tablet computer, among others. The computing system 500 may include a processor 502 that is adapted to execute stored instructions, as well as a memory device 504 that stores instructions that are executable by the processor 502. The processor 502 can be a single core processor, a multi-core processor, a computing cluster, or any number of other configurations. The memory device 504 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 502 may be connected through a system bus 506 (e.g., PCI, ISA, PCI-Express, HyperTransport®, NuBus, etc.) to an input/output (I/O) device interface 508 adapted to connect the computing system 500 to one or more I/O devices 510. The I/O devices 510 may include, for example, a keyboard and a pointing device, wherein the pointing device may include a touchpad or a touchscreen, among others. The I/O devices 510 may be built-in components of the computing system 500, or may be devices that are externally connected to the computing system 500.

The processor 502 may also be linked through the system bus 506 to a display interface 512 adapted to connect the computing system 500 to a display device 514. The display device 514 may include a display screen that is a built-in component of the computing system 500. The display device 514 may also include a computer monitor, television, or projector, among others, that is externally connected to the computing system 500.

A network interface card (NIC) 516 may be adapted to connect the computing system 500 through the system bus 506 to a network (not depicted). The network (not depicted) may be a wide area network (WAN), local area network (LAN), or the Internet, among others.

An eUSB2 interface 518 may be adapted to connect to the computing system 500 through the system bus 506. The eUSB2 interface 518 may transmit and receive data from USB devices 520 through a eUSB2 repeater 522. The eUSB2 repeater 522 can convert high voltage signals into low voltage signals.

It is to be understood that the block diagram of FIG. 5 is not intended to indicate that the computing system 500 is to include all of the components shown in FIG. 5. Rather, the computing system 500 can include fewer or additional components not illustrated in FIG. 5 (e.g., additional USB ports, additional eUSB2 interfaces, additional network interfaces, etc.). Furthermore, any of the functionalities of the eUSB2 repeater 522 may be partially, or entirely, implemented in hardware and/or in the processor 502. For example, the functionality may be implemented with an application specific integrated circuit or in logic implemented in the processor 502, among others.

Figure 6:
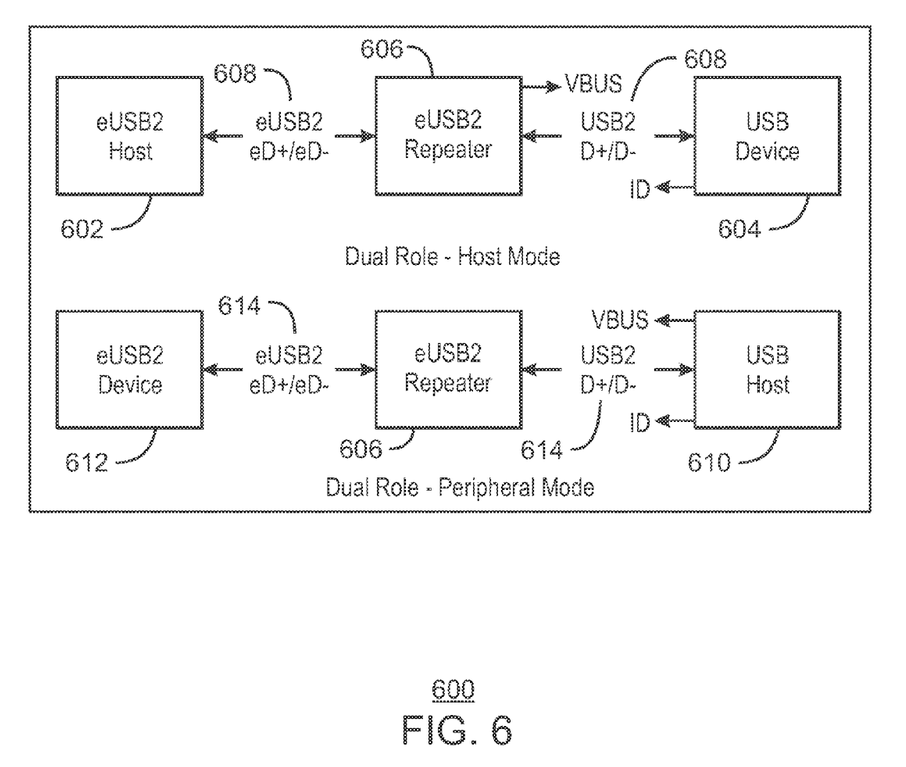
FIG. 6 is an example of a dual role eUSB2 repeater that communicates data between two devices.

FIG. 6 is an example of a dual role eUSB2 repeater that communicates data between a host and a device. In some embodiments, the two devices include an eUSB2 host 602 and a standard USB2 device 604. The dual role allows each device to function as a device and a host. For example, if a standard USB2 device is connected to a computing system with an eUSB2 interface, the standard USB2 device may be able to transmit data to the computing system as a host or a device.

In some embodiments, the eUSB2 repeater 606 supports a static Dual Role Function, which is an extension of host mode eUSB2 repeater 606. The Static Dual Role Function is a commonly used On-the-Go (also referred to herein as OTG) mode. AN On-the-Go mode, as referred to herein, is a protocol that allows a standard USB device or eUSB2 device to act as both a host and a device. For example, a digital audio player connected to a computing system can host the computing system by controlling the flow of data.

In some embodiments, the eUSB2 repeater 606 can transmit data from an eUSB2 host 602 to a USB2 device 604. The eUSB2 host 602 may schedule and configure data transfers over the data wires 608. The USB2 device 604 is a device, which may not be able to initiate data transfers. As a device, the USB2 device 604 may respond to requests for data sent by the eUSB2 host 602.

In some embodiments, the eUSB2 repeater 606 can transmit data from a USB2 host 610 to an eUSB2 device 612 through data lines 614. The USB host 610 may schedule and configure data transfers over the data wires 614. The eUSB2 device 612 is a device in this example, so the eUSB2 device 612 may not be able to initiate data transfers. As a device, the eUSB2 device 612 may respond to requests for data sent by the USB2 host 610.

In some embodiments, an eUSB2 repeater 606 can determine the role of an OTG capable port by the polarity of the ID pin. For example, the eUSB2 repeater 606 can determine the polarity of the ID pin when an OTG capable port is connected to a non-OTG capable host or device. In some examples, an OTG capable device has a micro-AB receptor. When a micro-A plug is inserted, the OTG device can present itself as a host enumerating the device. If a micro-B plug is inserted, the OTG device can function as a pre-defined device function, such as a mass storage.

Figure 7:
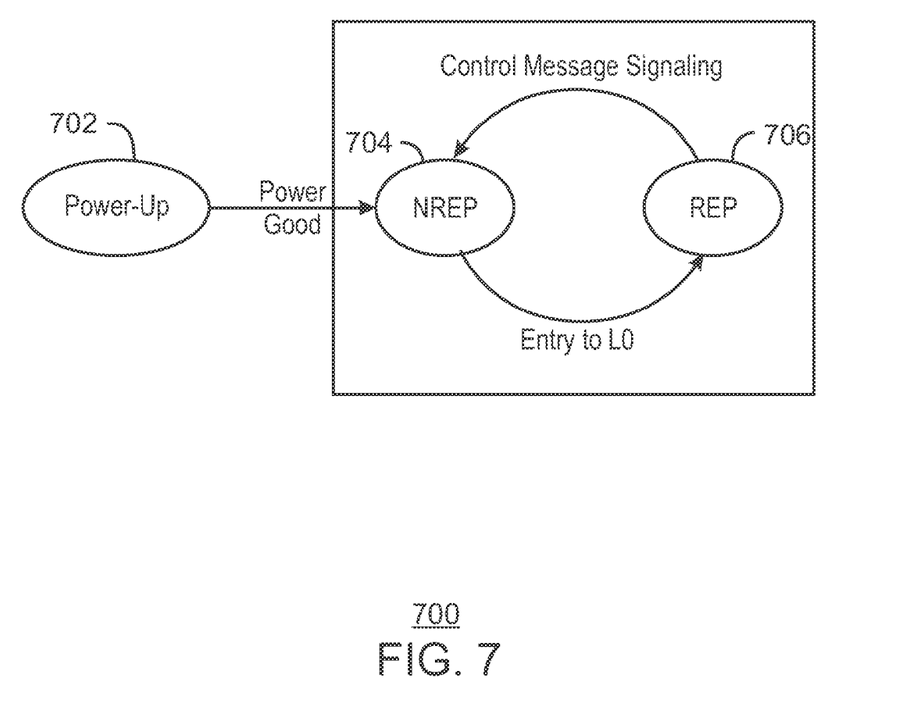
FIG. 7 is an illustration of an example eUSB2 repeater state machine.

FIG. 7 is an illustration of an example eUSB2 repeater state machine. The power-up block 702 indicates the eUSB2 repeater is connected to a power source. In some embodiments, upon power up by the system, the eUSB2 repeater may enter non-repeater mode (NREP) 704 where it may initialize itself for standard USB2 device connect detection and subsequent operations relating to device initialization such as reset based on control message and speed negotiation. Once the device initialization is complete, the eUSB2 repeater may enter a repeater (REP) mode 706 ready for USB2 data packet forwarding between a eUSB2 enabled host and a standard USB2 device.

Although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A universal serial bus repeater, comprising:
   a first universal serial bus port logic to be coupled to a first low voltage signal line and to a second low voltage signal line;
   a second universal serial port logic to be coupled to a first high voltage signal line and to a second high voltage signal line; and
   a controller to control a direction of data flow of the first universal serial bus port logic and the second universal serial bus port logic, wherein the controller is coupled to the first universal serial bus port logic and to the second universal serial port logic, wherein a repetition of a data state in the data flow is to indicate to the controller a transmission of the data flow between the first universal serial bus port logic and the second universal serial port logic, and wherein the controller is to select a downstream data flow direction or an upstream data flow direction.

2. The universal serial bus repeater of claim 1, wherein the first low voltage signal line and the second low voltage signal line use 1 volt digital signaling.

3. The universal serial bus repeater of claim 1, wherein the first high voltage signal line and the second high voltage signal line use 3.3 volt analog signaling.

4. The universal serial bus repeater of claim 1, wherein the first low voltage signal line and the second low voltage signal line use 1 volt digital signaling and wherein the first high voltage signal line and the second high voltage signal line use 3.3 volt analog signaling.

5. The universal serial bus repeater of claim 1, wherein the first low voltage signal line and the second low voltage signal line use 0.2 volt differential signaling.

6. The universal serial bus repeater of claim 1, wherein the second universal serial bus port logic is a USB2 port.

7. The universal serial bus repeater of claim 1, wherein the first universal serial bus port logic is an eUSB2 port and the second universal serial bus port logic is a USB2 port.

8. The universal serial bus repeater of claim 1, wherein the repeater is a half-duplex analog repeater.

9. The universal serial bus repeater of claim 1, wherein the controller comprises a repeater state machine.

10. The universal serial bus repeater of claim 1, wherein the first universal serial bus port logic is to receive data from and is to transfer data to the first and second low voltage signal lines.

11. The universal serial bus repeater of claim 1, wherein the second universal serial bus port logic is to receive data from and is to transfer data to the first and second high voltage signal lines.

12. The universal serial bus repeater of claim 1, wherein the first universal serial bus port logic is to receive data from and is to transfer data to the first and second low voltage signal lines, and wherein the second universal serial bus port logic is to receive data from and is to transfer data to the first and second high voltage signal lines.

13. The universal serial bus repeater of claim 1, wherein the controller is to detect an electrical signal of a first protocol from the first universal serial bus port logic or the second universal serial bus port logic, to determine a data flow direction, to convert the electrical signal to a second protocol, and to send the electrical signal of the second protocol to the other of the first port or the second port.

14. The universal serial bus repeater of claim 13, wherein the first protocol comprises single-ended signaling and the second protocol comprises differential signaling.

15. The universal serial bus repeater of claim 13, wherein the electrical signal of the first protocol comprises a command to be executed by the repeater.

16. The universal serial bus repeater of claim 15, wherein the command to be executed by the repeater comprises a disconnect command that stops the repeater from forwarding the electrical signal.

17. The universal serial bus repeater of claim 15, wherein the command to be executed by the repeater comprises a SYNC command that indicates the repeater is to forward data in the electrical signal to the second device.

18. The universal serial bus repeater of claim 15, wherein the controller is to detect and send data that follows the command to be executed by the repeater and is to be transmitted from the repeater.

19. The universal serial bus repeater of claim 15, wherein the speed of the electrical signal of the first protocol comprises a low speed, a full speed, or a high speed.

20. The universal serial bus repeater of claim 13, wherein the electrical signal of the second protocol indicates the end of data flow with a sequence of electrical signals.

21. The universal serial bus repeater of claim 13, wherein the controller is to stop the electrical signal of the second protocol when the electrical signal of the second protocol indicates an end of data flow.

22. The universal serial bus repeater of claim 1, wherein the controller is to multiplex data flow between the first port and second port.

23. The universal serial bus repeater of claim 1, wherein the controller is to multiplex data flow between the first universal serial bus port logic and the second universal serial bus port logic based on input from a single-ended receiver or a squelch circuit.

24. The universal serial bus repeater of claim 1, wherein the direction of data flow comprises an upstream data flow indication or a downstream data flow indication.

25. The universal serial bus repeater of claim 1, wherein the controller is to wait a predetermined period of time before selecting the direction of data flow.

26. The universal serial bus repeater of claim 1, wherein the controller is to detect a command for the repeater in an electrical signal received at the first and/or second low voltage signal lines or at the first and/or second high voltage signal lines.

27. The universal serial bus repeater of claim 1, wherein the first high voltage signal line and the second high voltage signal line use 0.4 volt differential signaling.

28. The universal serial bus repeater of claim 1, wherein the first low voltage signal line and the second low voltage signal line use 0.2 volt differential signaling and wherein the first high voltage signal line and the second high voltage signal line use 0.4 volt differential signaling.

29. The universal serial bus repeater of claim 1, wherein the first universal serial bus port logic is an eUSB2 port.

30. The universal serial bus repeater of claim 1, wherein the controller comprises a repeater state machine and one or more multiplexers.

31. A system for communicating data between a first device and a second device, comprising:
a universal serial bus repeater, comprising:
a first universal serial bus port logic to be coupled to a first low voltage signal line and to a second low voltage signal line;
a second universal serial port logic to be coupled to a first high voltage signal line and to a second high voltage signal line; and
a controller to control a direction of data flow of the first universal serial bus port logic and the second universal serial bus port logic, wherein the controller is coupled to the first universal serial bus port logic and to the second universal serial port logic, wherein a repetition of a data state in the data flow is to indicate to the controller a transmission of the data flow between the first universal serial bus port logic and the second universal serial port logic, and wherein the controller is to select a downstream data flow direction or an upstream data flow direction;
a first device comprising the first universal serial bus port logic; and
a second device comprising the second universal serial bus port logic, wherein the universal serial bus repeater is to couple the first device and the second device to communicate data between the first device and the second device.

32. The system of claim 31, wherein the universal serial bus repeater is to detect and forward data received from the first device or from the second device.

33. The system of claim 31, wherein the universal serial bus repeater is to detect a disconnect command, wherein the universal serial bus repeater discontinues the communication of data between the first device and the second device.

34. The system of claim 31, wherein the universal serial bus repeater is configured to comprises a repeater state machine and one or more multiplexers.

35. A method of communicating data, comprising:
detecting an electrical signal of a first protocol from a first device;
selecting a downstream data flow or an upstream data flow for the electrical signal of the first protocol, wherein the selecting controls a data flow direction of the electrical signal of the first protocol, and wherein the repetition of a data state in the electrical signal of the first protocol is to indicate a transmission of the electrical signal of the first protocol between the first device and the second device;
converting the electrical signal of the first protocol to an electrical signal of a second protocol; and
transmitting the electrical signal of the second protocol to a second device.

36. The method of claim 35, sending the electrical signal of the first protocol from the first device to a multiplexer to select the downstream data flow or the upstream data flow.

37. The method of claim 35, comprising waiting a predetermined period of time before selecting the downstream data flow or the upstream data flow for the electrical signal of the first protocol.

38. The method of claim 35, comprising discontinuing the transmitting of the electrical signal of the second protocol to the second device.

* * * * *